United States Patent
Burgio et al.

(10) Patent No.: US 6,718,942 B2
(45) Date of Patent: Apr. 13, 2004

(54) METHOD FOR ESTIMATION OF THE QUANTITY OF FRESH AIR PRESENT IN THE INTAKE AND EXHAUST MANIFOLDS OF AN INTERNAL COMBUSTION ENGINE WITH A RECIRCULATION CIRCUIT

(75) Inventors: Gilberto Burgio, Aachen (DE); Alessandro Palazzi, Bologna (IT); Renzo Ruggiani, Bologna (IT); Mauro Suffritti, Medolla (IT)

(73) Assignee: Magneti Marelli Powertrain SPA, Turin (IT)

( * ) Notice: Subject to any disclaimer, the term of this patent is extended or adjusted under 35 U.S.C. 154(b) by 96 days.

(21) Appl. No.: 10/042,299

(22) Filed: Jan. 11, 2002

(65) Prior Publication Data

US 2002/0152016 A1 Oct. 17, 2002

(30) Foreign Application Priority Data

Jan. 12, 2001 (IT) .................... BO2001A0010

(51) Int. Cl.⁷ ............................................. F02D 41/14
(52) U.S. Cl. ...................... 123/350; 123/698; 123/399; 701/108
(58) Field of Search ................. 123/350, 698, 123/568.21, 399; 701/108

(56) References Cited

U.S. PATENT DOCUMENTS

| | | | |
|---|---|---|---|
| 5,205,260 A | * | 4/1993 | Takahashi et al. .......... 123/494 |
| 5,755,212 A | * | 5/1998 | Ajima ....................... 123/674 |
| 5,974,870 A |   | 11/1999 | Treinies et al. |
| 6,029,451 A | * | 2/2000 | Gartner ...................... 123/704 |
| 6,082,325 A | * | 7/2000 | Digeser et al. ............. 123/299 |
| 6,481,423 B2 | * | 11/2002 | Muller et al. .......... 123/568.11 |

FOREIGN PATENT DOCUMENTS

| | | |
|---|---|---|
| DE | 197 56 919 A1 | 10/1998 |
| DE | 198 30 300 A1 | 1/2000 |
| DE | 100 17 280 A1 | 10/2001 |
| EP | 0 719 919 A2 | 7/1996 |
| EP | 1 024 275 A2 | 8/2000 |
| FR | 2 789 731 | 8/2000 |

OTHER PUBLICATIONS

Amstutz et al., "EGO Sensor Based Robust Output Control of EGR in Diesel Engines", 8425 IEEE Transactions on Control Systems Technology, No. 1, Mar., 1995, pp. 39–48.
Chang et al., "Air–Fuel Ratio Control in Spark–Ignition Engines Using Estimation Theory", 8425 IEEE Transactions on Control Systems Technology, No. 1, Mar., 1995, pp. 22–31.

* cited by examiner

Primary Examiner—Henry C. Yuen
Assistant Examiner—Arnold Castro
(74) Attorney, Agent, or Firm—Liniak, Berenato & White

(57) ABSTRACT

Method for estimation of the quantity of fresh air present in the intake and exhaust manifolds of an internal combustion engine with a recirculation circuit, by an observer, applied to a system of the third order, which models the physical system constituted by the intake and exhaust manifolds; the system is obtained from differential equations, which regulate the processes of mixing of the gases, and from an equation which represents the behavior of a lambda sensor.

17 Claims, 1 Drawing Sheet

METHOD FOR ESTIMATION OF THE QUANTITY OF FRESH AIR PRESENT IN THE INTAKE AND EXHAUST MANIFOLDS OF AN INTERNAL COMBUSTION ENGINE WITH A RECIRCULATION CIRCUIT

The present invention relates to a method for estimation of the quantity of fresh air present in the intake and exhaust manifolds of an internal combustion engine with a recirculation circuit (also known as an "EGR circuit").

BACKGROUND OF THE INVENTION

As is known, the control system of an internal combustion engine must admit into each cylinder, and as each cycle, a quality of fuel (i.e. petrol or diesel), and a quantity of comburant (i.e. of fresh air containing approximately 20% oxygen), determined such as to make combustion take place in optimum conditions, in order to maximise the performance and reduce the generation of pollutant substances.

In internal combustion engines, the quantity of fresh air which is admitted into each cylinder depends only on the position of the butterfly valve, whereas in internal combustion engines with a recirculation circuit, part of the gases present in the exhaust manifold is recirculated, and admitted into the intake manifold, and thus the quantity of fresh air admitted into each cylinder depends both on the position of the butterfly valve, and on the flow rate and composition of the recirculation gases. In particular, the flow rate of the recirculated gas can reach 30% of the flow rate of the butterfly valve, and the percentage of fresh air in the exhaust gases can reach 50%; it is therefore apparent that up to 15% of the fresh air present in the intake manifold can be obtained from the recirculation pipe.

In order to allow the control system of an internal combustion engine with a recirculation circuit to operate correctly, it is necessary to provide the control system itself in real time with an estimate of the quantity of fresh air present in the intake and exhaust manifolds, so as to allow the control system to actuate both the butterfly valve and the recirculation valve, in order to admit into each cylinder the optimum quantity of fresh air, according to the quantity of fuel provided.

It is know to determine in real time an estimate of the quantity of fresh air present in the intake and exhaust manifolds, by means of a pair of linear oxygen sensors, which are disposed respectively in the intake manifold and in the exhaust manifold; however, this solution is relatively costly, owing to the high cost of the linear oxygen sensors.

It has also been proposed to estimate the quantity of fresh air present in the exhaust manifold, using the signal of the lambda sensor disposed in the exhaust pipe; however, this signal of the lambda sensor which is disposed in the exhaust pipe has delays which are very lengthy (typically of approximately 200 ms) in relation to the duration of a cycle of the engine (variable between 10 and 100 ms), and thus it does not allow the control system to have relatively good dynamic control performance levels (in particular in response to the sudden variations).

SUMMARY OF THE INVENTION

The object of the present invention is to provide a method for estimation of the quantity of fresh air present in the intake and exhaust manifolds of an internal combustion engine with a recirculation circuit, which is free from the disadvantages described, and which in particular is easy and economical to actuate.

According to the present invention, a method is provided for estimation of the quantity of fresh air present in the intake and exhaust manifolds of an internal combustion engine with a recirculation circuit.

BRIEF DESCRIPTION OF THE DRAWING

The present invention will now be described with reference to the attached drawing, which illustrates a non-limiting embodiment of it, in which the attached FIGURE is a schematic view of an internal combustion engine, with a recirculation circuit which operates according to the method which is the subject of the present invention.

DETAILED DESCRIPTION OF THE INVENTION

Figure 1:
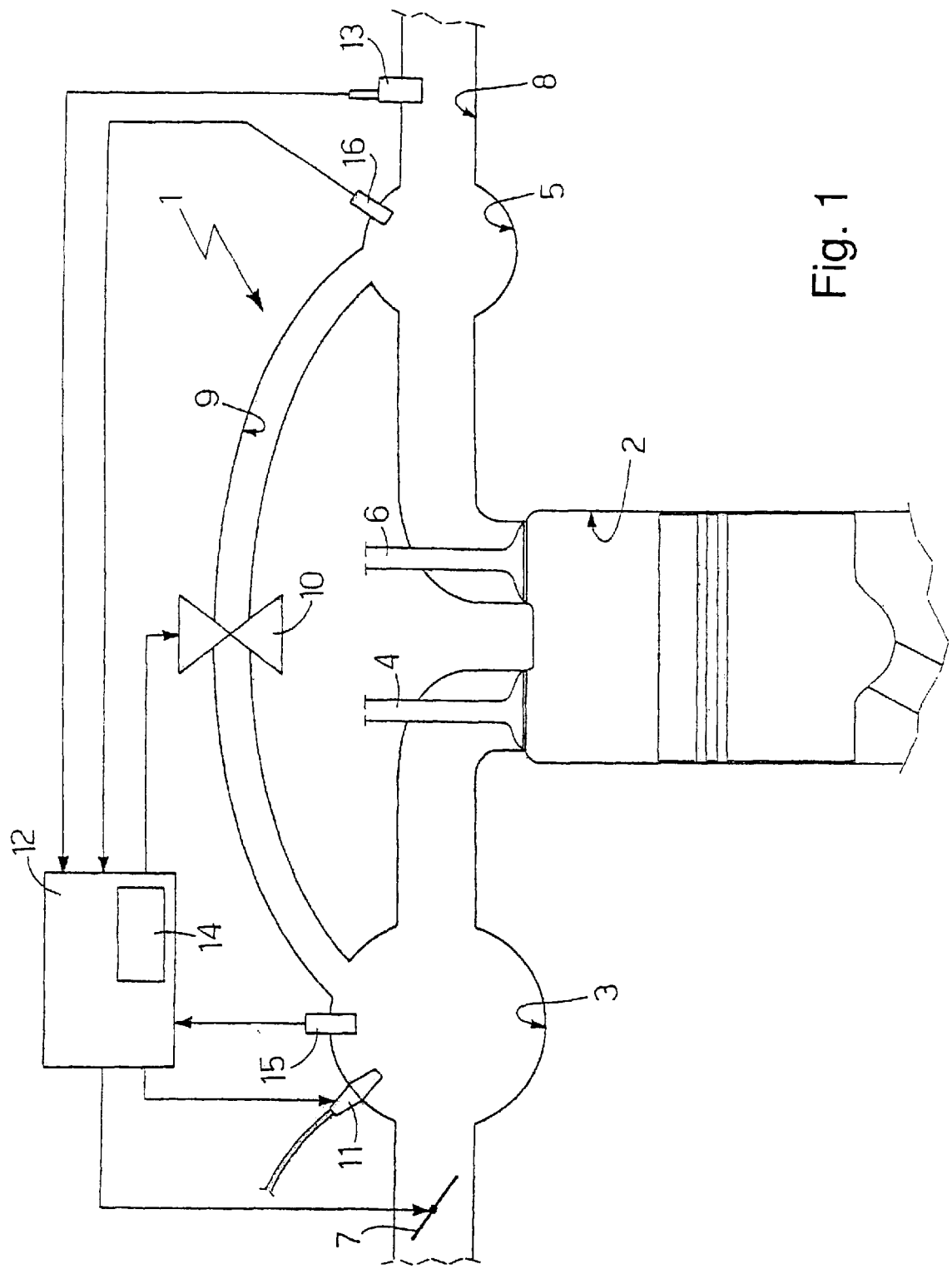

In FIG. 1, 1 indicates as a whole an internal combustion engine which is provided with four cylinders 2 (of which only one is illustrated in FIG. 1), each of which is connected to an intake manifold 3 by means of a respective intake valve 4, and to an exhaust manifold 5 by means of a respective exhaust valve 6. The intake manifold 3 receives fresh air (i.e. air which is obtained from the external environment, and contains approximately 20% oxygen), by means of a butterfly valve 7, which can be regulated between a position of closure and a position of maximum opening. From the exhaust manifold 5 there extends an exhaust pipe 8, which ends in a silencer (which is known and is not illustrated), in order to emit into the atmosphere the gases produced by combustion, and a recirculation pipe 9, which connects the exhaust manifold 5 to the intake manifold 3, and is regulated by a recirculation valve 10, which can be regulated between a position of closure and a position of maximum opening.

According to a preferred embodiment, the fuel (for example petrol, diesel, methane, LPG, etc.) is injected directly into each cylinder 2, by means of a respective injector 11 of a substantially known type; according to a different embodiment, not illustrated, the injector 11 or the injectors 11 are disposed inside the intake manifold 3.

The engine 1 additionally comprises a control unit 12, which, in particular, controls in each cycle the butterfly valve 7, the recirculation valve 10, and the injectors 11, in order to fill the cylinders 2 with a quantity of mixture of comburant (fresh air) and fuel, with a ratio which is determined according to the operative conditions of the engine 1, and is dependent on the commands received from the driver. There is connected to the control unit 12 a lambda sensor 13, which is physically disposed in the exhaust pipe 8, and can determine in a known manner the quantity of oxygen present in the gases contained in the exhaust pipe 8 itself.

The control unit 12 is provided with an estimator device 14, which can supply the control unit 12 itself with an instant-by-instant estimate of the mass $m_{aira}$ of fresh air present in the intake manifold 3, and an estimate of the mass $m_{airs}$ of fresh air present in the exhaust manifold 5; in particular, the estimator device 14 can supply the control unit 12 instant by instant with an estimate of the percentage $\%_{aira}$ of fresh air present in the intake manifold 3, and an estimate of the percentage $\%_{airs}$ of fresh air present in the exhaust manifold 5, compared with the corresponding overall masses of gas $m_{colla}$ and $m_{colls}$ present respectively in the intake manifold 3 and in the exhaust manifold 5. In other words:

$$\%_{aira}=100*(m_{aira}/m_{colla})$$

$$\%_{airs}=100*(m_{airs}/m_{colls})$$

In order to estimate instant by instant the mass $m_{aira}$ of fresh air present in the intake manifold 3, and the mass $m_{airs}$ of fresh air present in the exhaust manifold 5, the physical system constituted by the intake 3 and exhaust manifolds is modelled with the differential equations which regulate the process of mixing of the gases in the intake 3 and exhaust 5 manifolds themselves:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \dfrac{dm_{EGR}}{dt} \cdot \dfrac{m_{aira}}{m_{colls}} - \dfrac{dm_{out}}{dt} \cdot \dfrac{m_{airs}}{m_{colls}} \end{cases}$$

in which:

$dm_{thr}/dt$ is the flow rate of air supplied by the butterfly valve 7, which consists entirely of fresh air, since it is obtained directly from the atmosphere;

$dm_{EGR}/dt$ is the flow rate of gas in the recirculation pipe 9, which, since it is obtained from the exhaust manifold 5, contains a fraction equal to $m_{airs}/m_{colls}$ of fresh air;

$dm_{eng}/dt$ is the flow rate of gas supplied to the cylinder 2, which, since it is obtained from the intake manifold 3, contains a fraction equal to $m_{aira}/m_{colla}$ of fresh air;

$dm_{fuel}/dt$ is the flow rate of fuel injected in the cylinder 2, which fuel consumes an quantity of fresh air equal to its mass, multiplied by the stoichiometric ratio $AF_{stech}$ (which in the case of air/petrol is equal to 14.56); and $dm_{out}/dt$ is the flow rate of gas in the exhaust pipe 8, which, since it is obtained from the exhaust manifold 5, contains a fraction equal to $m_{airs}/m_{colls}$ of fresh air.

In order to simplify the equations provided above, it is assumed that there is no accumulation of mass in the exhaust manifold 5; in other words, it is assumed that in the exhaust manifold 5, the variation of the percentage $\%_{airs}$ of fresh air is caused exclusively by the variation of the concentrations input by the cylinder 2, and is not affected by the variation of accumulation of mass. This hypothesis is realistic, and does not introduce significant errors, since the exhaust manifold 5 generally has a reduced volume (which is significantly smaller than the volume of the intake manifold 3), and is summarised by the following equation:

$$\frac{dm_{out}}{dt} = \frac{dm_{eng}}{dt} + \frac{dm_{fuel}}{dt} - \frac{dm_{EGR}}{dt}$$

On the basis of this hypothesis, the differential equations which regulate the process of mixing of the gases in the intake 3 and exhaust 5 manifolds become:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \left(\dfrac{dm_{eng}}{dt} + \dfrac{dm_{fuel}}{dt}\right) \cdot \dfrac{m_{aira}}{m_{colls}} \end{cases}$$

In addition to the above-described modelling of the physical system constituted by the intake 3 and exhaust manifolds, there is modelling of the transport of the gas through the exhaust pipe 8, as far as the lambda sensor 13, including the delay in response of the lambda sensor 13 itself; this subsystem is approximated with a filter of the first order, represented by the following equation:

$$\frac{dm_{airlam}}{dt} = -\frac{1}{t_\lambda} \cdot (m_{airlam} - m_{airs})$$

in which:

$m_{airlam}$ is the mass of fresh air equivalent to the oxygen reading carried out by the lambda sensor 13; and $t_\lambda$ is the time constant of the filter of the first order, i.e. approximately one third of the response time of the lambda sensor 13.

It should be noted that the equivalent mass $m_{airlam}$ of fresh air does not have physical significance, since no increase in density of the mass of gas occurs at the lambda sensor 13; the mass $m_{airlam}$ of equivalent fresh air represents the mass of fresh air which would be obtained in a hypothetical manifold placed at the point of connection of the sensor, and filled with a gas with a mass equivalent to the overall mass $m_{colls}$ of gas present in the exhaust manifold 5. The equivalent mass $m_{airlam}$ of fresh air is associated with the measurement $\lambda$ of the lambda sensor 13, by a known static ratio.

By applying the state equation of the gases to the intake manifold 3 and to the exhaust manifold 5, the following equations are obtained:

$$m_{colla} = \frac{P_{colla} \cdot V_{colla}}{R \cdot T_{colla}}$$

$$m_{colls} = \frac{P_{colls} \cdot V_{colls}}{R \cdot T_{colls}}$$

in which:

$P_{colla}$ is the pressure of the gas in the intake manifold 3, which is measured in real time by a sensor 15 of a known type disposed in the intake manifold 3 itself;

$T_{colla}$ is the temperature of the gas in the intake manifold 3, which is measured in real time by the sensor 15;

$V_{colla}$ is the internal volume of the intake manifold 3, which is constant and known from the design data of the intake manifold 3 itself;

$P_{colls}$ is the pressure of the gas in the exhaust manifold 5, which is measured in real time by a sensor 16 of a known type, disposed in the exhaust manifold 5 itself;

$T_{colls}$ is the temperature of the gas in the exhaust manifold 5, which is measured in real time by the sensor 16;

$V_{colls}$ is the internal volume of the exhaust manifold 5, which is constant, and is known from the design data of the exhaust manifold 5 itself; and R is the constant of the gases present in the intake 3 and exhaust 5 manifolds. The constant R varies as the composition of the gases present varies (in particular when the molecular weight of the gases present varies); however, the variation of the constant R between fresh air and combustion gas is very low, and in the first approximation of the above equations, it is always possible to use a single constant average value equal to 287 Pa m³/° K Kg.

The foregoing description can be summarised in an overall system S of the third order, with variable coefficients recapitulated by the equations:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \left(\dfrac{dm_{eng}}{dt} + \dfrac{dm_{fuel}}{dt}\right) \cdot \dfrac{m_{aira}}{m_{colls}} \\ \dfrac{dm_{airlam}}{dt} = -\dfrac{1}{t_\lambda} \cdot (m_{airlam} - m_{airs}) \end{cases}$$

As state variables of the system S, there are selected the mass $m_{aira}$ of fresh air present in the intake manifold 3, the mass $m_{airs}$ of fresh air present in the exhaust manifold 5, and the mass $m_{airlam}$ of fresh air equivalent to the oxygen reading carried out by the lambda sensor 13; these state variables are described by the vector x:

$$x = \begin{bmatrix} m_{aira} \\ m_{airs} \\ m_{airlam} \end{bmatrix}$$

As input variables of the system S, there are selected the flow rate $dm_{thr}/dt$ of air supplied by the butterfly valve 7, and the flow rate $dm_{fuel}/dt$ of fuel injected in the cylinder 2; these input variables are described by the vector u:

$$u = \begin{bmatrix} \dfrac{dm_{thr}}{dt} \\ \dfrac{dm_{fuel}}{dt} \end{bmatrix}$$

Finally, as output variable of the system S, there is selected the mass $m_{airlam}$ of fresh air equivalent to the reading carried out by the lambda sensor 13; this output variable is described by the vector y:

y=[$m_{airlam}$]

The matrices A(u) and B of coefficients and the vector C of coefficients are also defined:

$$A(u) = \begin{bmatrix} -\dfrac{\dfrac{dm_{eng}}{dt}}{m_{colla}} & \dfrac{\dfrac{dm_{EGR}}{dt}}{m_{colls}} & 0 \\ \dfrac{\dfrac{dm_{eng}}{dt}}{m_{colla}} & -\dfrac{\dfrac{dm_{eng}}{dt} + \dfrac{dm_{fuel}}{dt}}{m_{colla}} & 0 \\ 0 & \dfrac{1}{t_\lambda} & -\dfrac{1}{t_\lambda} \end{bmatrix}$$

$$B = \begin{bmatrix} 1 & 0 \\ 0 & -AF_{stech} \\ 0 & 0 \end{bmatrix}$$

$$C = \begin{bmatrix} 0 & 0 & 1 \end{bmatrix}$$

It should be noted that one of the elements of the matrix A depends on the flow rate $dm_{fuel}/dt$ of fuel injected in the cylinder 2, i.e. by one of the inputs u; however, this dependency is relatively low, since in the calculation of the coefficient of the matrix A, the flow rate $dm_{fuel}/dt$ of fuel injected in the cylinder 2 is added to the flow rate $dm_{eng}/dt$ of air supplied to the cylinder 2, which is numerically far more significant than the flow rate $dm_{fuel}/dt$ of fuel itself. Substantially, therefore, the eigenvalues are stable, and are influenced little by the inputs u, and for this reason, in the following description, the dependence of the matrix A on the inputs u is disregarded; it should however be noted that the eigenvalues vary when the drive point varies.

To summarise the foregoing information, the system S is recapitulated by the equations:

$$\begin{cases} \dfrac{dx}{dt} = A \cdot x + B \cdot u \\ y = C \cdot x \end{cases}$$

The system S of differential equations which determines the stationary conditions (zero drift and balance of mass in the intake manifold 3) provides the following equation, which associates the measurement λ by the lambda sensor 13 (normally contained between 0.9 and 3), with the output y of the dynamic system S:

$$\lambda \cdot AF_{stech} = \dfrac{\dfrac{dm_{thr}}{dt}}{\dfrac{dm_{fuel}}{dt}}$$

$$m_{airlam}(\lambda) = m_{colls} \cdot \dfrac{AF_{stech} \cdot (\lambda - 1)}{1 + \lambda \cdot AF_{stech}}$$

The above equations are sufficient to summarise for an observer O the state x of the system S, which (as can easily be determined from the well-known theory of observers) can be observed when the following determining factor is other than zero:

$$\det \begin{bmatrix} C \\ C \cdot A \\ C \cdot A^2 \end{bmatrix} = -\dfrac{1}{t_\lambda^2} \dfrac{\dfrac{dm_{eng}}{dt}}{m_{colla}}$$

and this condition of other than zero always applies when the engine 1 is in motion.

If the system S is summarised, the following is obtained:

$$\begin{cases} \dfrac{d\underline{x}}{dt} = A \cdot \underline{x} + K \cdot u + K \cdot (y - \underline{y}) \\ \underline{y} = C \cdot \underline{x} \end{cases}$$

-continued $$K = \begin{bmatrix} k_1 \\ k_2 \\ k_3 \end{bmatrix}$$

in which the matrices x and y are the estimated values of x and y (where y is $m_{airlam}(\lambda)$ previously described) A, B and C are the matrices of the real system S previously described, and the vector K is the gain of the observer O, by means of which the poles of the observer O itself are fixed.

The final form of the observer O in the state space is:

$$\begin{cases} \dfrac{dx}{dt} = (A - B \cdot C) \cdot x + B \cdot u + K \cdot y \\ \underline{y} = C \cdot \underline{x} \end{cases}$$

The above-described observer O is an observer O of the state of the composition of gas in the intake/exhaust system of the engine 1, it is implemented in a known manner in the estimator device 14, and can be activated as soon as the engine 1 is started up. Experimental tests have shown that it is advantageous to wait for the engine 1 to reach thermal stability before activating the observer O.

The output of the observer O consists of the estimates $\underline{m}_{airs}$ and $m_{airs}$ of the masses of fresh air present respectively in the intake manifold 3 and in the exhaust manifold 5; these estimates can be expressed in the form of a percentage, since, from the equation of the gases previously provided, there are known the overall masses of gas $m_{colla}$ and $m_{colls}$ which are present respectively in the intake manifold 3 and in the exhaust manifold 5. The estimator device 1 can thus supply in real time to the control unit 12 an estimate of the percentage $\%_{aira}$ of fresh air present in the intake manifold 3, and an estimate of the percentage $\%_{airs}$ of fresh air present in the exhaust manifold 5, in relation to the corresponding overall masses $m_{colla}$ and $m_{colls}$ of gas present respectively in the intake manifold 3 and in the exhaust manifold 5.

During functioning of the engine 1, the control unit 12 uses the estimates of the percentages $\%_{aira}$ and $\%_{airs}$ of fresh air present in the intake manifold 3 and the exhaust manifold 5, in order to control the butterfly valve 7, the recirculation valve 10, and the injectors 11, in order to fill the cylinders 2 with a quantity of mixture of comburant (fresh air) and fuel, with a ratio which is determined according to the operative conditions of the engine 1, and according to the commands received from the driver.

Preferably, the objectives of the flow rate of the recirculation valve 10 (or EGR valve) and of the butterfly valve 7 are indicated as the objective flow rate $dm_{airtotobj}/dt$ of fresh air required in the cylinder 2, and as the objective ratio EGR_EFF_OBJ between the flow rate $dm_{EGR}/dt$ of gas supplied by the recirculation pipe 9, and the overall flow rate $dm_{eng}/dt$ of gas supplied to the cylinder 2; these objectives are determined in a known manner by the control unit 12, according to the drive point, in order to optimise the combustion in the cylinder 2.

The objective flow rate $dm_{airtotobj}/dt$ and the objective ratio EGR_EFF_OBJ are translated into an objective flow rate $dm_{throbj}/dt$ of air through the butterfly valve 7, and into an objective flow rate $dm_{EGRobj}/dt$ of gas through the recirculation pipe 9, in order to control the butterfly valve 7 and the recirculation valve 10 directly; this translation of the objectives is implemented by means of the following equations:

$$\frac{dm_{EGRobj}}{dt} = \frac{dm_{airtotobj}}{dt} \cdot \frac{EGR\_EFF\_OBJ}{1 - \left(1 - \frac{\%_{airs}}{100}\right) \cdot EGR\_EFF\_OBJ} - k_p \cdot (\%_{airaobj} - \%_{aira})$$

$$\%_{airaobj} = EGR\_EFF\_OBJ + \frac{\dfrac{dm_{thr}}{dt} - \dfrac{dm_{EGR}}{dt} \cdot \left(1 - \dfrac{\%_{airs}}{100}\right)}{\dfrac{dm_{thr}}{dt} + \dfrac{dm_{EGR}}{dt}}$$

$$\frac{dm_{throbj}}{dt} = \frac{dm_{EGRobj}}{dt} \cdot \frac{1 - EGR\_EFF\_OBJ}{EGR\_EFF\_OBJ}$$

It should be noted that in the calculation of the objective flow rate $dm_{EGRobj}/dt$ of air through the recirculation pipe 9, there is present a corrective term of a proportional type, which is caused by the difference between an objective value $\%_{airaobj}$ of the percentage of fresh air present in the intake manifold 3, and the actual percentile value $\%_{aira}$ of fresh air present in the intake manifold 3; this corrective term of a proportional type substantially constitutes a proportional regulator, and is used to guarantee a flow-rate peak through the recirculation pipe 9, in order to permit rapid emptying or rapid filling of the intake manifold 3, according to the objectives determined by the control unit 12. In other words, this proportional corrective term (which can be calibrated by using the multiplication factor $k_p$) makes it possible to speed up the dynamics of filling of the mixture of fresh air and inert gas in the intake manifold 3, and thus in the cylinder 2.

In addition, it should be noted that in the above-described equations, which make it possible to calculate the objective flow rate of air $dm_{throbj}/dt$ through the butterfly valve 7, and the objective flow rate of gas $dm_{EGRobj}/dt$ through the recirculation pipe 9, there are present the estimates of the percentages $\%_{aira}$ and $\%_{airs}$ of fresh air, which estimates constitute the dynamic estimate terms of the observer O.

The above-described control of the objectives makes it possible to supply the actuators of the butterfly valves 7 and of the recirculation valve 10 with positioning objectives which are constantly in line with the current state supplied by the observer O, and consequently, both in transitory conditions and in stationary conditions, the above-described control of the objectives assures perfect consistency with the objective flow rate $dm_{airtotobj}/dt$, and with the objective ratio EGR_EFF_OBJ.

The observer O associates with one another substantially all the main control values of the engine 1 (with the exception of the advance value); according to a preferred embodiment, the control unit 12 carries out cyclically a check on the estimates of the main control values of the engine 1. In other words, the control unit 12 verifies that the estimates supplied by the observer O of the main control values of the engine 1 coincide, obviously within a certain interval of tolerance, with the values determined for the same control values, by other devices for measurement and/or estimation. For example, the estimated value $\underline{\lambda}$ of the measurement by the lambda sensor 13 is compared with the actual value $\lambda$ of the measurement by the lambda sensor 13, when the actual value $\lambda$ is available (normally with a delay of 100–300 ms); if there is a difference between the two values which is greater than the tolerances accepted, the control unit 12 corrects the estimates, and seeks the causes which have given rise to the difference between the two values. By this means, the control unit 12 can both carry out self-diagnosis (by verifying whether the estimated value and the measured value coincide), and carry out self-correction (it modifies its own estimates in order to attempt to obtain coincidence between the estimated value and the measured value).

According to a preferred embodiment, the control unit 12 uses the estimated value $\hat{\lambda}$ of the measurement by the lambda sensor 13, supplied by the estimator device 14, in order to control the engine 1, in combination with, or as an alternative to, the actual value λ of the measurement by the lambda sensor 13; use of the estimated value $\hat{\lambda}$ of the measurement by the lambda sensor 13 has two indisputable advantages, since this estimated value $\hat{\lambda}$ is not affected by measurement delays (on the other hand the actual value λ has delays which are variable between 100 and 330 ms, for an engine cycle of between 10 and 100 ms), and the estimated value $\hat{\lambda}$ could be available for each individual cylinder 2. From the foregoing description, it is apparent that, by using the estimated value $\hat{\lambda}$ of the measurement by the lambda sensor 13 supplied by the estimator device 14, the control unit 12 could implement independent control of the count for each individual cylinder 2.

What is claimed is:

1. Method for estimation of the quantity of fresh air ($m_{aira}$, $m_{airs}$) present in the intake and exhaust manifolds (3, 5) of an internal combustion engine (1) with a recirculation circuit (9, 10), by an observer (O) of the third order, applied to a system (S), which models the physical system constituted by the intake and exhaust manifolds (3, 5); the system (S) to be observed being obtained from differential equations, which regulate the processes of mixing of the gases, and from an equation which represents the behaviour of a lambda sensor (13); the state variables (x) of the said system (S) being a mass ($m_{aira}$) of fresh air which is present in the intake manifold (3), a mass ($m_{airs}$) of fresh air which is present in the exhaust manifold (5) and a mass ($m_{airlam}$) of fresh air equivalent to the oxygen reading carried out by a lambda sensor (13).

2. Method according to claim 1, wherein the input variables (u) of the said system (S) are a flow rate ($dm_{thr}/dt$) of air supplied by a butterfly valve (7), and a flow rate ($dm_{fuel}/dt$) of fuel injected in the cylinder (2); and the output variable (y) of the said system (S) being a mass ($m_{oxylam}$) of oxygen, which is equivalent to the oxygen reading carried out by the lambda sensor (13).

3. Method according to claim 1, wherein the said differential equations which regulate the processes of mixing of the gases are:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \dfrac{dm_{EGR}}{dt} \cdot \dfrac{m_{aira}}{m_{colls}} - \dfrac{dm_{out}}{dt} \cdot \dfrac{m_{airs}}{m_{colls}} \end{cases}$$

in which:

$m_{aira}$ is the mass of fresh air present in the intake manifold (3);

$m_{colla}$ is the overall mass of gas present in the intake manifold (3);

$m_{airs}$ is the mass of fresh air present in the exhaust manifold (5);

$m_{colls}$ is the overall mass of gas present in the exhaust manifold (5);

$dm_{thr}/dt$ is the flow rate of air supplied by a butterfly valve (7);

$dm_{EGR}/dt$ is the flow rate of gas of the recirculation pipe (9);

$dm_{eng}/dt$ is the flow rate of gas supplied to the cylinder (2);

$dm_{fuel}/dt$ is the flow rate of fuel injected in the cylinder (2);

$AF_{stech}$ is the stoichiometric ratio; and $dm_{out}/dt$ is the flow rate of gas in an exhaust pipe (8).

4. Method according to claim 3, wherein the said differential equations which regulate the processes of mixing of the gases are simplified as:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \left( \dfrac{dm_{eng}}{dt} + \dfrac{dm_{fuel}}{dt} \right) \cdot \dfrac{m_{aira}}{m_{colls}} \end{cases}$$

5. Method according to claim 1, wherein the behaviour of the said lambda sensor (13) is modelled with a filter of the first order, represented by the following equation:

$$\dfrac{dm_{airlam}}{dt} = -\dfrac{1}{t_\lambda} \cdot (m_{airlam} - m_{airs})$$

wherein:

$m_{airs}$ is the mass of fresh air present in the exhaust manifold (5);

$m_{airlam}$ is a mass of fresh air equivalent to the oxygen reading carried out by the said lambda sensor (13); and $t\lambda$ is the time constant of the filter of the first order.

6. Method according to claim 2, wherein the said system (S) of the third order to be observed is represented by the equations:

$$\begin{cases} \dfrac{dx}{dt} = A \cdot x + B \cdot u \\ y = C \cdot x \end{cases}$$

in which:

x is a vector which represents the state variables of the system (S);

y is a vector which represents the output variable of the system (S);

u is a vector which represents the input variables of the system (S);

A is the state matrix of the system (S);

B is the matrix of the inputs of the system (S); and

C is the matrix of the outputs of the system (S).

7. Method according to claim 6, wherein the said overall mass ($m_{colla}$) of gas present in the intake manifold (3) and the said overall mass ($m_{colls}$) of gas present in the exhaust manifold (5) are determined by applying the equation of the gases, in the knowledge of the volume ($V_a$, $V_s$) of the intake and exhaust manifolds (3, 5), and by measuring the pressure ($P_a$, $P_s$) and temperature ($T_a$, $T_s$) of the gases present in the intake and exhaust manifolds (3, 5).

8. Method according to claim 6, wherein a measurement (λ) by the said lambda sensor (13) is associated with the output variable (y) of the said system (S) by the equation:

$$m_{airlam}(\lambda) = m_{colls} \cdot \frac{AF_{stech} \cdot (\lambda - 1)}{1 + \lambda \cdot AF_{stech}}$$

in which:

$m_{airlam}$ is a mass of fresh air equivalent to the oxygen reading carried out by the said lambda sensor (13);

$AF_{stech}$ is the stoichiometric ratio; and $m_{colls}$ is the overall mass of gas present in the exhaust manifold (5).

9. Method according to claim 6, wherein the said observer (O) has the following final form:

$$\begin{cases} \dfrac{d\underline{x}}{dt} = (A - K \cdot C) \cdot \underline{x} + B \cdot u + K \cdot y \\ \underline{y} = C \cdot \underline{x} \end{cases}$$

in which:

$\underline{x}$ and $\underline{y}$ are the estimated values of the vectors x and y, respectively of the state variables and of the output of the system (S);

A is the state matrix of the system (S);

B is the matrix of the inputs of the system (S);

C is the matrix of the outputs of the system (S); and

K is the vector of gain of the observer (O), by means of which the poles of the observer (O) itself are fixed.

10. Method according to claim 1, wherein the objectives of the flow rate of a recirculation valve (10) and of a butterfly valve (7) are expressed as a first objective flow rate ($dm_{airtotobj}/dt$) of fresh air required in the cylinder (2), and as an objective ratio (EGR_EFF_OBJ) between a flow rate ($dm_{EGR}/dt$) of gas in the recirculation pipe (9), and a flow rate ($dm_{eng}/dt$) of gas supplied altogether to the cylinder (2).

11. Method according to claim 10, wherein the said first objective flow rate ($dm_{airtotobj}/dt$), and the said objective ratio (EGR_EFF_OBJ) are translated into a second objective flow rate ($dm_{throbj}/dt$) of air through a butterfly valve (7), and into a third objective flow rate ($dm_{EGRobj}/dt$) of gas through a recirculation pipe (9), in order to control directly a butterfly valve (7) and a recirculation valve (10); this translation of the objectives is implemented by means of the following equations:

$$\frac{dm_{EGRobj}}{dt} = \frac{dm_{airtotobj}}{dt} \cdot \frac{EGR\_EFF\_OBJ}{1 - \left(1 - \dfrac{\%_{airs}}{100}\right) \cdot EGR\_EFF\_OBJ} - k_p \cdot (\%_{airaobj} - \%_{aira})$$

$$\%_{airaobj} = EGR\_EFF\_OBJ + \frac{\dfrac{dm_{thr}}{dt} - \dfrac{dm_{EGR}}{dt} \cdot \left(1 - \dfrac{\%_{airs}}{100}\right)}{\dfrac{dm_{thr}}{dt} + \dfrac{dm_{EGR}}{dt}}$$

$$\frac{dm_{throbj}}{dt} = \frac{dm_{EGRoby}}{dt} \cdot \frac{1 - EGR\_EFF\_OBJ}{EGR\_EFF\_OBJ}$$

wherein:

EGR_EFF_OBJ is the said objective ratio;

$dm_{airtotobj}/dt$ is the said first objective flow rate;

$dm_{throbj}/dt$ is the said second objective flow rate;

$dm_{EGRobj}/dt$ is the said third objective flow rate;

$\%_{aira}$ is the percentage of fresh air present in the intake manifold (3);

$\%_{airs}$ is the percentage of fresh air present in the exhaust manifold (5); and $\%_{airobj}$ is the objective of the percentage of fresh air present in the intake manifold (3).

12. Method according to claim 1, wherein the said observer (O) supplies an estimated value ($\underline{\lambda}$) of the measurement by the said lambda sensor (13), which estimated value ($\underline{\lambda}$) is used in order to control the said engine (1) as an alternative to, or together with the actual value ($\lambda$) of the measurement by the lambda sensor (13).

13. Method according to claim 1, wherein at least one estimate of a control value of the said engine (1), estimated by the said observer (O), is compared with a successive measurement of the same value, in order to verify the reliability of the observer (O) or of the measurement.

14. Method according to claim 13, wherein an estimated value ($\underline{\lambda}$) by the said observer (O), of the measurement by the lambda sensor (13), is compared with an actual value ($\lambda$) of the measurement by the lambda sensor itself (13), in order to verify the reliability of the observer (O) or of the measurement.

15. Method for estimation of the quantity of fresh air ($m_{aira}$, $m_{airs}$) present in the intake and exhaust manifolds (3, 5) of an internal combustion engine (1) with a recirculation circuit (9, 10), by an observer (O), applied to a system (S), which models the physical system constituted by the intake and exhaust manifolds (3, 5); the system (S) to be observed being obtained from differential equations, which regulate the processes of mixing of the gases, and from an equation which represents the behaviour of a lambda sensor (13), wherein the said differential equations which regulate the processes of mixing of the gases are:

$$\begin{cases} \dfrac{dm_{aira}}{dt} = \dfrac{dm_{thr}}{dt} \cdot 1 + \dfrac{dm_{EGR}}{dt} \cdot \dfrac{m_{airs}}{m_{colls}} - \dfrac{dm_{eng}}{dt} \cdot \dfrac{m_{aira}}{m_{colla}} \\ \dfrac{dm_{airs}}{dt} = \dfrac{dm_{eng}}{dt} \cdot \dfrac{m_{aira}}{m_{colls}} - \dfrac{dm_{fuel}}{dt} \cdot AF_{stech} - \dfrac{dm_{EGR}}{dt} \cdot \dfrac{m_{aira}}{m_{colls}} - \dfrac{dm_{out}}{dt} \cdot \dfrac{m_{airs}}{m_{colls}} \end{cases}$$

in which:

$m_{aira}$ is the mass of fresh air present in the intake manifold (3);

$m_{colla}$ is the overall mass of gas present in the intake manifold (3);

$m_{airs}$ is the mass of fresh air present in the exhaust manifold (5);

$m_{colls}$ is the overall mass of gas present in the exhaust manifold (5);

$dm_{thr}/dt$ is the flow rate of air supplied by a butterfly valve (7);

$dm_{EGR}/dt$ is the flow rate of gas of the recirculation pipe (9);

$dm_{eng}/dt$ is the flow rate of gas supplied to the cylinder (2);

$dm_{fuel}/dt$ is the flow rate of fuel injected in the cylinder (2);

$AF_{stech}$ is the stoichiometric ratio; and $dm_{out}/dt$ is the flow rate of gas in an exhaust pipe (8).

16. Method for estimation of the quantity of fresh air ($m_{aira}$, $m_{airs}$) present in the intake and exhaust manifolds (3, 5) of an internal combustion engine (1) with a recirculation circuit (9, 10), by an observer (O), applied to a system (S), which models the physical system constituted by the intake and exhaust manifolds (3, 5); the system (S) to be observed being obtained from differential equations, which regulate the processes of mixing of the gases, and from an equation which represents the behavior of a lambda sensor (13), wherein the state variables (x) of said system (S) are a mass ($m_{aira}$) of fresh air which is present in the intake manifold (3), a mass ($m_{airs}$) of fresh air which is present in the exhaust manifold (5) and a mass ($m_{airlam}$) of fresh air equivalent to the oxygen reading carried out by a lambda sensor (13); the input variables (u) of said system (S) being a flow rate ($dm_{thr}/dt$) of air supplied by a butterfly valve (7), and a flow rate ($dm_{fuel}/dt$) of fuel injected in the cylinder (2); and the output variable (y) of said system (S) being a mass ($m_{oxylam}$) of oxygen, which is equivalent to the oxygen reading carried out by the lambda sensor (13), and wherein said system (S) of the third order to be observed is represented by the equations:

$$\begin{cases} \frac{dx}{dt} = A \cdot x + B \cdot u \\ y = C \cdot x \end{cases}$$

in which:

x is a vector which represents the state variables of the system (S);

y is a vector which represents the output variable of the system (S);

u is a vector which represents the input variables of the system (S);

A is the state matrix of the system (S);

B is the matrix of the inputs of the system (S); and

C is the matrix of the outputs of the system (S).

17. Method for estimation of the quantity of fresh air ($m_{aira}$, $m_{airs}$) present in the intake and exhaust manifolds (3, 5) of an internal combustion engine (1) with a recirculation circuit (9, 10), by an observer (O), applied to a system (S), which models the physical system constituted by the intake and exhaust manifolds (3, 5); the system (S) to be observed being obtained from differential equations, which regulate the processes of mixing of the gases, and from an equation which represents the behavior of a lambda sensor (13), wherein the objectives of the flow rate of a recirculation valve (10) and of a butterfly valve (7) are expressed as a first objective flow rate ($dm_{airtotobj}/dt$) of fresh air required in the cylinder (2), and as an objective ratio (EGR_EFF_OBJ) between a flow rate ($dm_{EGR}/dt$) of gas in the recirculation pipe (9), and a flow rate ($dm_{eng}/dt$) of gas supplied altogether to the cylinder (2), and wherein said first objective flow rate ($dm_{airtotobj}/dt$), and said objective ratio (EGR_EFF_OBJ) are translated into a second objective flow rate ($dm_{throbj}/dt$) of air through a butterfly valve (7), and into a third objective flow rate ($dm_{EGRobj}/dt$) of gas through a recirculation pipe (9), in order to control directly a butterfly valve (7) and a recirculation valve (10); this translation of the objectives is implemented by means of the following equations:

$$\frac{dm_{EGRobj}}{dt} = \frac{dm_{airtotobj}}{dt} \cdot \frac{EGR\_EFF\_OBJ}{1 - \left(1 - \frac{\%_{airs}}{100}\right) \cdot EGR\_EFF\_OBJ} - k_p \cdot (\%_{airaobj} - \%_{aira})$$

$$\%_{airaobj} = EGR\_EFF\_OBJ + \frac{\frac{dm_{thr}}{dt} - \frac{dm_{EGR}}{dt} \cdot \left(1 - \frac{\%_{airs}}{100}\right)}{\frac{dm_{thr}}{dt} + \frac{dm_{EGR}}{dt}}$$

$$\frac{dm_{throbj}}{dt} = \frac{dm_{EGRobj}}{dt} \cdot \frac{1 - EGR\_EFF\_OBJ}{EGR\_EFF\_OBJ}$$

wherein:

EGR_EFF_OBJ is the said objective ratio;

$dm_{airtotobj}/dt$ is the said first objective flow rate;

$dm_{throbj}/dt$ is the said second objective flow rate;

$dm_{EGRobj}/dt$ is the said third objective flow rate;

$\%_{aira}$ is the percentage of fresh air present in the intake manifold (3);

$\%_{airs}$ is the percentage of fresh air present in the exhaust manifold (5); and $\%_{airobj}$ is the objective of the percentage of fresh air present in the intake manifold (3).

* * * * *